Aug. 26, 1969 W. M. DAVIS, JR 3,464,021
TRANSISTOR AMPLIFIER APPARATUS HAVING COMMON MODE REJECTION
Filed April 21, 1967
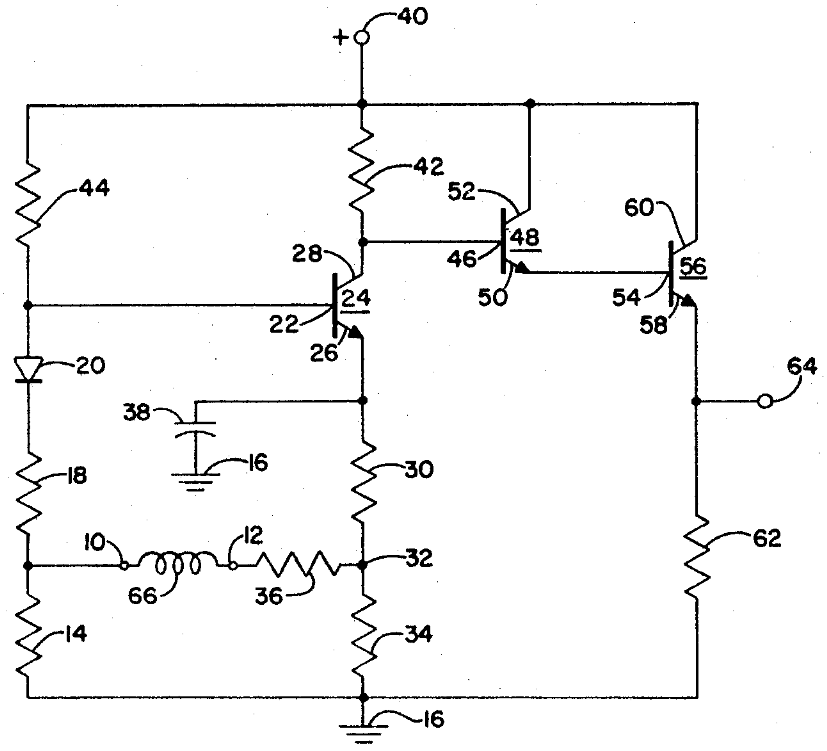
INVENTOR.
WILLIAM M. DAVIS, JR.
BY Bruce C Lutz
ATTORNEY United States Patent Office
3,464,021
Patented Aug. 26, 1969

3,464,021

TRANSISTOR AMPLIFIER APPARATUS HAVING COMMON MODE REJECTION

William M. Davis, Jr., Boston, Mass., assignor to Honeywell Inc., Minneapolis, Minn., a corporation of Delaware Filed Apr. 21, 1967, Ser. No. 632,710
Int. Cl. H03f *3/68*
U.S. Cl. 330—30 4 Claims

ABSTRACT OF THE DISCLOSURE

This specification discloses a transistor amplifier designed in such a way that, when an ungrounded input signal source or differential input signal is applied between the base and emitter of the input transistor, common mode input signals are rejected.

BACKGROUND AND SUMMARY OF THE INVENTION

This invention pertains to amplifying apparatus and more specifically to a transistor amplifier that exibits common mode rejection.

It is often necessary to amplify differential signals, such as those developed across a magnetic pickoff, in which neither end of the signal source is grounded. Under these circumstances common mode signals, i.e., signals where the potential of two or more terminals is wholly or partly of the same polarity, may be generated and it is usually desirable to eliminate such signals from the signal which is to be amplified. In other words, only differences between the potentials of the two input signals are to be amplified. This invention provides a very simple transistor amplifier which exhibits common mode rejection. The differential input signal is applied between the base and emitter of the transistor and the output signal is taken from the collector. To obtain common mode rejection the gain of the base circuit is made substantially equal to the gain of the emitter circuit. When the two gains are equal or substantially equal, common mode input signals are rejected.

Accordingly, it is an object of this invention to provide amplifying apparatus in which common mode input signals are rejected.

This and other objects and advantages of this invention will become apparent to those skilled in the art upon a reading of this specification and the appended claims in conjunction with the drawing, of which:

The single feature is a schematic diagram of the preferred embodiment of this invention.

DESCRIPTION OF THE PREFERRED EMBODIMENT

In the drawing there is shown a first input means or terminal 10 and a second input means or terminal 12. Input terminal 10 is connected to one end of a resistance means or resistor 14 the other end of which is connected to a common conductor or ground 16. Terminal 10 is connected to one end of a resistance means or resistor 18 the other end of which is connected to the cathode of a undirectional current conducting device or diode 20. The anode of diode 20 is connected to an input means or base 22 of an amplifying means, current control means, or transistor 24 which further has an input means or emitter 26 and an output means or collector 28. Emitter 26 is connected to one end of a resistance means or resistor 30 the other end of which is connected to a junction point 32 which is further connected to ground 16 through a resistance means or resistor 34. Junction point 32 is further connected by a resistance means or resistor 36 to terminal 12. Emitter 26 is further connected by a capacitance means or capacitor 38 to ground 16. Collector 28 is connected to a source of positive energizing potential 40 by a resistance means or resistor 42. Source 40 is further connected by a resistance means or resistor 44 to base 22 of transistor 24.

Collector 28 of transistor 24 is connected to an input means or base 46 of a transistor means 48 which further has an output means or emitter 50 and a collector 52. Emitter 50 of transistor 48 is connected to an input means or base 54 of transistor means 56 which further has an output means or emitter 58 and a collector 60. Emitter 58 is connected by a resistance means or resistor 62 to ground 16 and is further connected to an output terminal 64. Collector 52 of transistor 48 and collector 60 of transistor 56 are both connected to positive source 40.

Transsistors 48 and 56 comprise a Darlington connected emitter-follower which follows the potential at collector 28 of transistor 24. The emitter-follower is used for impedance matching between collector 28 of transistor 24 and the output terminal 64.

In one specific application this invention was used as a preamplifier for signals which were obtained from an ungrounded secondary winding of a magnetic pickoff of a gyroscope. In the drawing winding 66 represents the ungrounded secondary winding and is connected between input terminals 10 and 12. Of course, the invention may be used in other applications where input signals are derived from other sources as well.

In operation, current flows from source 40 through resistor 44, diode 20, resistor 18, and resistor 14 to ground 16. This current flow establishes a bias potential at base 22 of transistor 24 so that transistor 24 is biased in an active region. Diode 20 is forward biased by the current flow therethrough so that it effectively becomes a small resistance in the circuit. However, diode 20 will limit the amplitude of input signals applied to terminal 10 if they became sufficiently large. Current will also flow from source 40 through resistor 42, transistor 24, resistor 30, and resistor 34 to ground 16. Current will also flow through capacitor 38 to ground 16 thereby charging capacitor 38. Capacitor 38 has a small capacitance so that it presents a substantial impedance at low frequencies.

This invention has two modes of operation. One mode is when terminal 10 is positive with respect to terminal 12 and the other mode is when terminal 12 is positive with respect to terminal 10. It should be noted that while the drawing shows terminals 10 and 12 connected to opposite ends of a floating or ungrounded winding, other sources such as separate signal sources could be connected to terminals 10 and 12 as well.

When input terminal 10 becomes positive with respect to input terminal 12, the first stage of the amplifier, which includes transistor 24 and the associated biasing circuitry, responds similar to an ordinary common-emitter amplifier. When the potential of terminal 10 increases in a positive direction with respect to the potential of terminal 12, base 22 of transistor 24 is correspondingly increased in potential with respect to emitter 26 so that transistor 24 conducts heavier thereby correspondingly decreasing the potential of collector 28 due to the increased volt drop across resistor 42. When the potential at terminal 10 decreases relative to terminal 12, but still remains positive with respect to terminal 12 the potential of base 22 correspondingly decreases thereby decreasing the conduction of transistor 24. The decrease in conduction of transistor 24 causes the potential of collector 28 to rise. The change in potential at collector 28 is equal to the product of the change in potential at terminal 10 with respect to terminal 12 times the gain of the circuit "looking" from terminal 10 through the base circuit to collector 28 of transistor 24.

When terminal 12 becomes positive with respect to terminal 10, the amplifier circuit responds similar to a common-base amplifier with an input signal applied at emitter 26. In this mode of operation, an increasing potential at terminal 12 with respect to terminal 10 correspondingly increases the potential at emitter 26 of transistor 24. An increase in potential at emitter 26 decreases the potential difference between base 22 and emitter 26 so that the conduction of transistor 24 is decreased thereby raising the potential of collector 28. When the potential at terminal 12 with respect to terminal 10 decreases, the potential of collector 28 is correspondingly decreased. In this mode of operation the change in potential at collector 28 again is proportional to the potential difference between terminals 12 and 10 times the circuit gain "looking" from terminal 12 through the emitter circuit of transistor 24 to collector 28.

Thus, it is seen that the amplifier has two gains depending upon the polarity of the potential differences between terminals 10 and 12. Common mode signals applied at terminals 10 and 12, i.e., signals where both terminals are of the same polarity which are superimposed on a differential signal will cause both the potential of the base and emitter of transistor 24 to change in the same direction. These changes will be cancelled if the two gains are equal or substantially equal. That is common mode signals at terminals 10 and 12 will be cancelled and will not appear at collector 28 of transistor 24. The gain of the base circuit is dependent upon the size of resistors 18 and 14 which can be adjusted to vary the gain. The gain of the emitter circuit is dependent upon the size of resistors 30, 34, and 36 which can be adjusted to vary the gain to make the gain in the base circuit substantially equal to the gain in the emitter circuit.

For illustrative purposes only, in one operable embodiment of this invention the following circiut components were used. The transistors were 2N930 transistors. Diode 20 was a 1N457 diode. Capacitor 38 was 10 picofarads. Resistors 14, 18, 34 and 62 were each 5,200 ohms. Resistor 30 was 7,500 ohms. Resistor 36 was 105 ohms. Resistor 42 was 150,000 ohms. Resistor 44 was 270,000 ohms. Supply 40 was a positive 35 volt DC. This circuit exhibited approximately 60 db common mode rejection.

This circuit is also susceptible to being integrated on a single chip of semiconductor. In one specific application of this invention, several of the amplifiers in integrated circuit form were mounted directly on the gimbals of a small gyroscope. Thus, the preamplifier was mounted in close proximity to the signal source so that signal degradation and noise effects were minimized.

While I have shown and described one embodiment of my invention, it is to be understood that those skilled in the art will realize that various modifications to my invention may be made.

I claim as my invention:

1. Amplifying apparatus comprising in combination:

transistor means having first input means, second input means, and output means;

means for supplying an energizing potential connected to said output means;

means connecting said first input means to said means for supplying an energization potential for supplying a bias current to said transistor means;

first resistive means connecting said first input means to a common conductor;

second resistive means connecting said second input means to said common conductor;

first input signal means connected to an intermediate point of said first resistive means; and second input signal means connected to an intermediate point of said second resistive means wherein an input signal is applied between said first and second input signal means and wherein said first and second resistive means are adjusted so that the circuit gain when said first input signal means is positive with respect to said second input signal means is equal to the circuit gain when said second input signal means is positive with respect to said first input signal means, the arrangement cancelling common mode signals applied between said first and second input signal means.

2. Amplifying apparatus as defined in claim 1 in combination with second transistor means having input means and output means wherein said input means of said second transistor means is connected to said output means of said first mentioned transistor means and said output means of said second transistor means is connected by means of a third resistive means to said common conductor.

3. Amplifying apparatus as defined in claim 2 wherein said first and second input signal means are connected to opposite ends of an ungrounded magnetic pickoff.

4. Amplifying apparatus as defined in claim 1 in combination with second transistor means having input means and output means wherein said input means of said second transistor means is connected to said output means of said first mentioned transistor means and said output means of said second transistor means is connected by means of a third resistive means to said common conductor.

References Cited

FOREIGN PATENTS 603,791 8/1960 Canada.

OTHER REFERENCES

Gardner—"Differential Amplifier," IBM Technical Disclosure Bulletin, p. 757, Feb. 9, 1965.

ROY LAKE, Primary Examiner

L. J. DAHL, Assistant Examiner

U.S. Cl. X.R.

330—29